Feb. 9, 1937. E. FREY 2,069,947
MACHINE FOR SHEARING BLOCKS FROM AN EXTRUDED COLUMN OF PLASTIC MATERIAL
Filed March 7, 1935
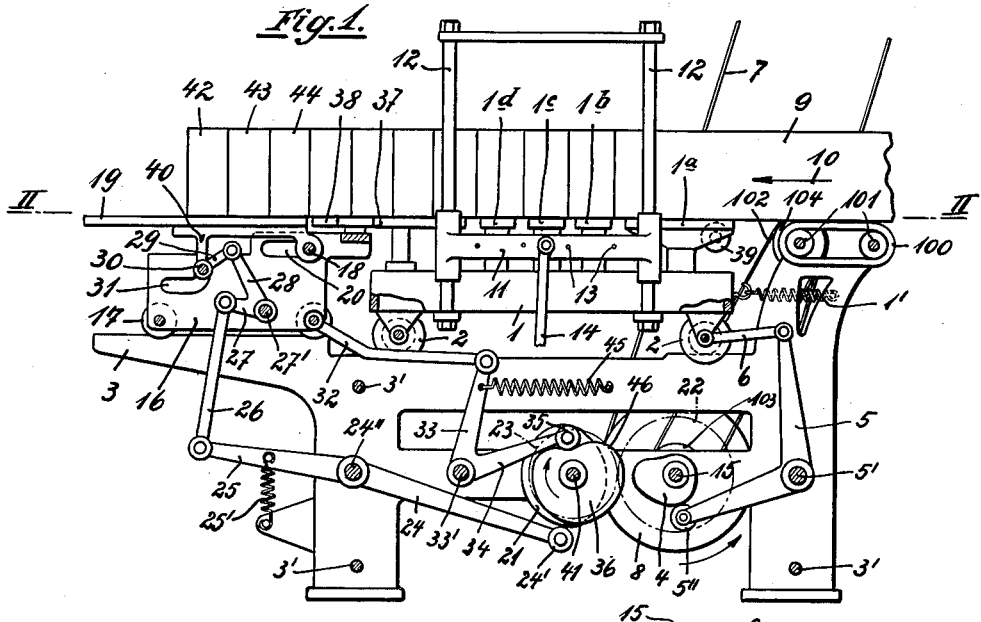
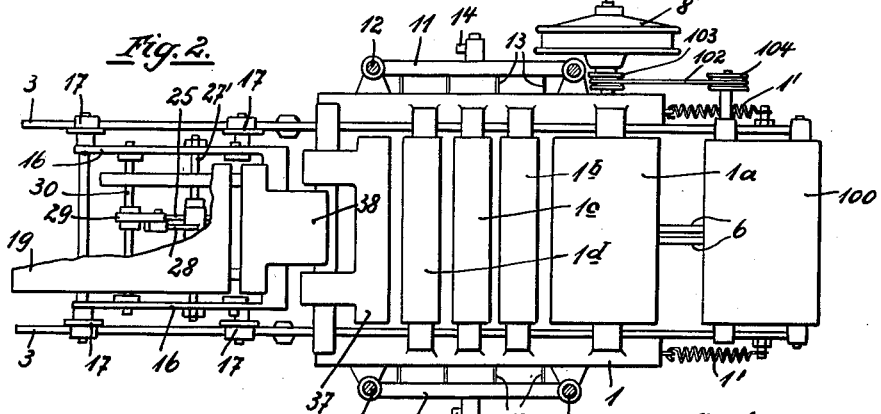
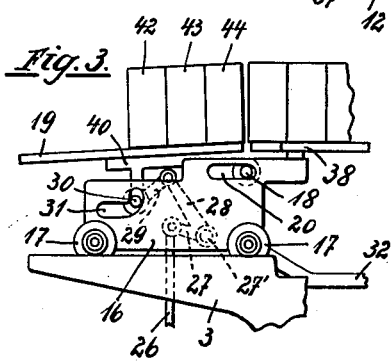
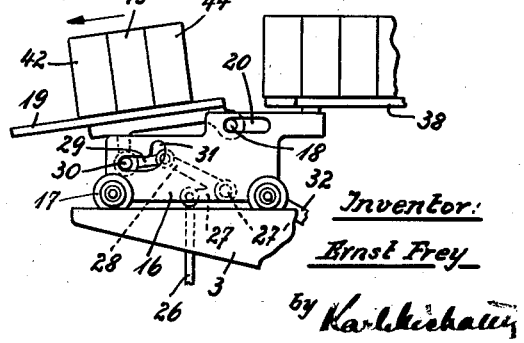
Inventor:
Ernst Frey Patented Feb. 9, 1937

2,069,947

UNITED STATES PATENT OFFICE 2,069,947

MACHINE FOR SHEARING BLOCKS FROM AN EXTRUDED COLUMN OF PLASTIC MATERIAL

Ernst Frey, Chur, Switzerland

Application March 7, 1935, Serial No. 9,755
In Switzerland October 24, 1934

15 Claims. (Cl. 25—108)

My invention relates to machines for shearing blocks from an extruded column of plastic material, for instance for shearing bricks from a column of clay. My invention relates more particularly to the means for separating or grouping the severed blocks.

Bands or plates as heretofore provided for separating or grouping the blocks involve the drawback that the gap which separates the blocks forming the group from the blocks still in the string of severed blocks, must be formed abruptly with a jerk, because the next group of blocks is fed to the band or plate exclusively by the movement of the string which requires about two-thirds of the time available, so that the time during which the grouping proper can be performed, is very short.

Another drawback of the known separating or grouping means consists therein that the way through which the band or plate moves when performing its function, is rather long as against the time available, so that, if the output of the extruding press is high, the members must move at a high velocity, at which throwing-over of the blocks cannot be prevented under all conditions.

It is an object of my invention to provide improved separating or grouping means which do not present the drawbacks characteristic of the known means referred to.

To this end I provide a movable table at the rear or delivery end of the machine for the reception of a given number or group of blocks severed from the column, and I provide means for moving the table in the direction in which the column is fed, but preferably at a velocity which is higher than the feeding velocity of the column, and means for returning the table into its initial position counter to the direction in which the column is fed.

In a preferred embodiment of my invention the movable table is mounted on a carriage, which will be referred to hereinafter as the "grouping" carriage, to distinguish it from the carriage of the shearing frame, and is temporarily moved at a velocity which is higher than the feeding velocity, independently of the movement of the grouping carriage, so that the table temporarily leads the carriage—which may move at the same velocity as the column, or at any other desired velocity —and the blocks on the table are effectively separated from those still in the string by the speeding-up of the grouped blocks. After the blocks have been removed from the table, the table and the carriage are returned into their initial position by moving the carriage at any desired velocity in a direction counter to the feeding movement of the column.

Since, during the return movement of the grouping carriage and its table, the table and the string of blocks move in opposite directions, it is clear that the time required for transmitting a fresh group to the table, is only a fraction of that otherwise required for separating a fresh group. This saving of time permits beginning with the formation of the groups at an earlier moment, so that ample time is available, and the movements during the grouping are performed at correspondingly low velocity.

Preferably the movable table is mounted to be tilted to the rear on the grouping carriage, and is so tilted before it is moved to temporarily lead the grouping carriage, so that, when the movement of the grouping carriage is arrested abruptly at the rear end of its stroke, the momentum of the grouped blocks causes them to slide downwardly on the tilted plate as on a chute. The gap between the first block of the group and the last block in the string is enlarged, and the grouping thus becomes still more effective.

In the drawing affixed to this specification and forming part thereof a machine embodying my invention is illustrated diagrammatically by way of example.

In the drawing

Fig. 1 is a partly sectional elevation of the machine,

Fig. 2 is a plan view of a section on the line II—II in Fig. 1, with the movable table partly broken away, Figs. 3 and 4 are detailed views showing the grouping carriage at an initial stage, and at the end of its grouping stroke, respectively.

Referring to the drawing and first to Figs. 1 and 2, the frame of the machine comprises two parallel side plates 3 and transverse stays 3'. 15 is the driving shaft which is mounted in suitable bearings of the frame, and 7 is a belt which, through a pulley and clutch 8, rotates the driving shaft in the direction of the arrow in Fig. 1. 4 is a cam on the driving shaft 15, and 5 is a bellcrank which is fulcrumed in the frame at 5'. A roller 5" at the end of the shorter bellcrank arm bears against the cam 4, the longer arm is connected to a carriage 1 by links 6. The carriage 1, which supports the shearing frame, as will be described later on, runs with wheels 2 on a track in the frame and is equipped with a pair of return springs 1' at its front end, which pull the carriage counter to the direction in which the column 9 is fed, as indicated by the arrow 10 in Fig. 1, and hold the roller 5" applied against the cam 4. The clutch of pulley 8 is operated in time with the intermittent feed movement of the column 10 and the carriage 1 also moves in time with such movement as it is driven from shaft 15.

The column is supported, at the inlet end of the machine, by a belt conveyer 100 on a pair of cylinders 101. The conveyer is operated from the driving shaft 15 through a rope 102, a sheave 103 on shaft 15 and a sheave 104 on the rear cylinder 101. The column 9 is supported by a long table 1a at the front end of the carriage. The blocks which have been severed by the shearing frame, are supported by three intermediate tables 1b, 1c and 1d, and a horse-shoe table 37 at the rear end of the carriage. The table 1a is equipped with a cylinder 39 for lubricating the lower face of the column 9.

The shearing frame, which shall now be described, moves on two pairs of uprights 12 at opposite sides of the carriage 1, and comprises a slide 11 on each pair of uprights and four cutting wires 13 extending across the frame from one slide 11 to the other. Links 14 are fulcrumed to the slides 11 and reciprocation is imparted to the links from any suitable mechanism (not shown).

The means for separating from the string of severed blocks a predetermined number or group of blocks, in the present instance the three blocks 42, 43 and 44 which have been severed at a time by the four wires 13, will now be described. It comprises a grouping carriage 16 which is mounted to run on a track at the rear end of the frame, with wheels 17, a shaft 18 mounted to slide and to turn in a slot 20 in each side plate of the grouping carriage 16, a bracket 40 on the shaft 18 and a table 19 on the bracket. The table 19 is mounted to reciprocate with, and to be tilted about, the shaft 18 in the slots 20, and a fixed table 38 whose projecting end extends into the clearance of the horse-shoe table 37 on the shearing carriage 1 is secured to the front end of frame 16.

The separating or grouping means is operated from a shaft 41, which is mounted in the frame of the machine and extends in parallel to the driving shaft 15. A spur gear 22 on the shaft 15 meshes with a spur gear 23 on the shaft 41, and the ratio of the spur gears on the respective shafts, in the example illustrated, is 4 to 3, because the shearing frame has four cutting wires 13, and three blocks are severed at a time, and then separated or grouped. If the number of blocks to be separated were equal to the number of cutting wires 13, the ratio of spur gears 22, 23 would be 1 to 1, and the carriages 1 and 16 might be combined into a single carriage, so that separate mechanism for operating the grouping carriage 16 would not be required. If the carriages were combined, however, the shearing frame could only have two wires 13 and this would require so rapid a succession of severing operations, that the shearing frame would be overstressed. Therefore it is preferred, in the majority of cases, to operate the shearing and grouping carriages separately.

Cam plates 21 and 36 are mounted on the shaft 41. The cam plate 36 cooperates with a roller 35 at the end of the longer arm 34 of a bellcrank, which is fulcrumed in the frame of the machine at 33' and whose shorter arm 33 is equipped with a return spring 54 and pivotally connected to one end of a link 32, whose other end is connected to the grouping carriage 16. The other cam plate 21 acts on a roller 24' at the longer arm 24 of a double-armed lever, which is fulcrumed in the frame at 24" and whose shorter arm 25 is equipped with a return spring 25' and is connected, through a link 26, to the shorter arm 27 of another bellcrank. This bellcrank is fulcrumed in the grouping carriage 16 at 27'. Its longer arm 28 is connected to a transverse bar 30 of the bracket 40 by a link 29. The transverse bar 30 engages in angular slots 31 in the side plates of the grouping carriage 16.

In operation the column 9 is fed intermittently by an extruding mechanism (not shown) and three blocks or bricks are severed by the cutting wires 13 at each operation of the shearing frame. The string of severed blocks is fed intermittently by the advancing column 10. When the first group of three bricks or blocks 42, 43, 44, is on the tilting table 19, while the grouping carriage 16 is at the front end of its stroke, the string is arrested, the table is tilted about its shaft 18 by cam plate 21 through the means described, and begins to move to the rear as soon as the transverse bar 30 has entered the curved portion of each slot 31. Fig. 3 shows one of the initial stages of this movement. At the same time cam plate 36 moves the grouping carriage 16 to the rear at the feeding velocity of the column 9 and into the final position illustrated in Fig. 4 in which the grouping carriage 16 is abruptly arrested, while the separated or grouped blocks or bricks move on by their momentum on the table 19 and are then removed by hand or delivered to a suitable conveyer (not shown).

After the final position of the grouping carriage has been attained, the tilting table 19 is returned into its horizontal position by the cam plate 21, whereupon the grouping carriage 16 is returned into its initial position (Fig. 1) by the steep gradient which begins at 46 on the cam plate 36. The machine is now ready for separating the next group of three blocks.

Obviously I am not limited to the separation or grouping of three blocks, but may handle in the manner described any number of blocks. Blocks which are thicker than about 2¾ in., are as a rule separated in groups at two blocks only.

I wish it to be understood that I do not desire to be limited to the exact details of construction shown and described for obvious modifications will occur to a person skilled in the art.

I claim:—

1. In an automatic machine for shearing blocks from a column of clay in combination, a shearing frame, means for operating said frame, a grouping carriage mounted for reciprocatory motion, a grouping table arranged on said carriage and means for positively advancing said table, when a grouping operation is started, together with the column of clay under treatment and for positively moving said table in a direction opposite to the direction of travel of the column of clay, after the grouping operation is ended.

2. In an automatic machine for shearing blocks from a column of clay, in combination, a shearing frame, means for operating said frame, a grouping carriage mounted for reciprocatory motion, a grouping table arranged on said carriage and means for positively advancing said table, when a grouping operation is started, together with the column of clay under treatment and for positively moving said table in a direction opposite to the direction of travel of the column of clay, after the grouping operation is ended, and means for imparting to said table an advance movement relatively to said carriage.

3. In an automatic machine for shearing blocks from a column of clay, in combination, a shearing frame, means for operating said frame, a grouping carriage mounted for reciprocatory motion, a grouping table arranged on said carriage and means for positively advancing said table, when a grouping operation is started, together with the column of clay under treatment and for positively moving said table in a direction opposite to the direction of travel of the column of clay, after the grouping operation is ended means for imparting to said table a movement relative to said carriage and means whereby the feeding of a number of fresh blocks cut from the column of clay to said table is brought about by the advance movement of the column of clay and by the opposite movement of said table.

4. In an automatic machine for shearing blocks from a column of clay, in combination, a shearing frame, means for operating said frame, a grouping carriage mounted for reciprocatory motion a tiltably mounted grouping table arranged on said carriage means for positively advancing said table, when a grouping operation is started, together with the column of clay under treatment and for positively moving said table in a direction opposite to the direction of travel of the column of clay, after the grouping operation is ended, and mechanism for tilting said table in preparation of a grouping operation.

5. In an automatic machine for shearing blocks from a column of clay, in combination, a shearing frame, means for operating said frame, a grouping carriage mounted for reciprocatory motion, a grouping table arranged on said carriage means for positively advancing said table, when a grouping operation is started, together with the column of clay under treatment and for positively moving said table in a direction opposite to the direction of travel of the column of clay, after the grouping operation is ended, and means for first tilting and thereafter advancing said table relative to said carriage through a predetermined distance and for suddenly stopping such advance so as to cause the group of blocks sheared from the column of clay to slide relative to said table and to thus increase their distance from the column of clay.

6. In an automatic machine for shearing blocks from a column of clay, in combination, a shearing frame, means for operating said frame, a grouping carriage mounted for reciprocatory motion, a grouping table arranged on said carriage a shaft for positively advancing said table, when a grouping operation is started, together with the column of clay under treatment and for positively moving said table in a direction opposite to the direction of travel of the column of clay, after the grouping operation is ended, and means for varying the angular velocity of said shaft in accordance with the variations of traveling speed of the column of clay.

7. In an automatic machine for shearing blocks from a column of clay, in combination, a carriage for supporting the column of clay to be treated and a grouping carriage arranged in series with said supporting carriage, means for reciprocating said grouping carriage relative to said supporting carriage, a table arranged for a reciprocatory movement relative to said grouping carriage and means for controlling the movements of said two carriages and said table.

8. In an automatic machine for shearing blocks from a column of clay, in combination, a carriage for supporting the column of clay to be treated and a grouping carriage arranged in series with said supporting carriage, means for reciprocating said grouping carriage relative to said supporting carriage, a table arranged for a reciprocatory and a tilting movement relative to said grouping carriage and means for controlling the movements of said two carriages and said table.

9. In an automatic machine for shearing blocks from a column of clay, in combination, a carriage for supporting the column of clay to be treated and a grouping carriage arranged in series with said supporting carriage, means for reciprocating said grouping carriage relative to said supporting carriage, a table arranged for a reciprocatory and a tilting movement relative to said grouping carriage and means for controlling the movements of said two carriages and said table, and for first tilting and thereafter advancing said table relative to said grouping carriage.

10. In an automatic machine for shearing blocks from a column of clay, in combination, a carriage for supporting the column of clay to be treated and a grouping carriage arranged in series with said supporting carriage, means for reciprocating said grouping carriage relative to said supporting carriage, a table arranged for a reciprocatory movement relative to said grouping carriage and means for controlling the movements of said two carriages and said table, said controlling means comprising a shaft and means for imparting to said shaft an angular velocity varying in proportion to the variations of travel of the clay column.

11. In a machine for shearing blocks from an extruded column of plastic material in combination, a shearing frame, means for operating said frame, a grouping carriage mounted to reciprocate on said machine, a pair of side plates forming part of said carriage said plates having straight slots, a shaft mounted to slide in said slots of said side plates, a movable table on said shaft for the reception of a given number or group of blocks severed from the column, means for reciprocating said carriage, a transverse bar on said movable table which bar is mounted to slide in angular slots of said side plates, and means for moving said shaft in said straight slots, and said transverse bar in said angular slots, independently of the movement of said carriage.

12. In a machine for shearing blocks from an extruded column of plastic material in combination, a shearing frame, means for operating said frame, a grouping carriage mounted to reciprocate on said machine, a pair of side plates forming part of said carriage said plates having straight slots, a shaft mounted to slide in said slots of said side plates, a movable table on said shaft for the reception of a given number or group of blocks severed from the column, a table fixed on said carriage in front of said movable table, a projection on said last-mentioned table, a table fixed on the machine and recessed for the reception of said projection, means for reciprocating said carriage, a transverse bar on said movable table which bar is mounted to slide in angular slots of said side plates, and means for moving said shaft in said straight slots, and said transverse bar in said angular slots, independently of the movement of said carriage.

13. In a machine for shearing blocks from an extruded column of plastic material in combination, a shearing frame, means for operating said frame, a grouping carriage mounted to reciprocate on said machine, a movable table mounted on said carriage for the reception of a given number or group of blocks severed from the column, a driving shaft, a shaft operatively connected to said driving shaft, means operatively connected to said last-mentioned shaft for reciprocating said carriage, and means for operating said movable table independently of the movement of said carriage.

14. In a machine for shearing blocks from an extruded column of plastic material in combination, a shearing frame, means for operating said frame, a movable table arranged at the rear or delivery end of the machine for the reception of a given number or group of blocks severed from the column, and means for operating said movable table so as to separate the blocks on the table from those still in the string of blocks.

15. In a machine for shearing blocks from an extruded column of plastic material in combination, a shearing frame, means for operating said frame, a movable table arranged at the rear or delivery end of the machine for the reception of a given number or group of blocks severed from the column, and means for operating said movable table so as to separate the blocks on the table from those still in the string of blocks and to impart to them a descending movement under the action of their own momentum.

ERNST FREY.